(12) United States Patent
Mathur et al.

(10) Patent No.: US 7,494,541 B2
(45) Date of Patent: Feb. 24, 2009

(54) KAOLIN PIGMENTS AND METHODS OF MAKING THE SAME

(75) Inventors: Sharad Mathur, Macon, GA (US); Kenneth W. Folmar, Macon, GA (US); David Kirk Thompson, Milledgeville, GA (US); Barry L. Daniels, McIntyre, GA (US)

(73) Assignee: BASF Corporation, Florham Park, NJ (US)

( * ) Notice: Subject to any disclaimer, the term of this patent is extended or adjusted under 35 U.S.C. 154(b) by 187 days.

(21) Appl. No.: 10/885,947

(22) Filed: Jul. 7, 2004

(65) Prior Publication Data
US 2006/0086289 A1 Apr. 27, 2006

(51) Int. Cl.
C04B 14/04 (2006.01)

(52) U.S. Cl. .............. 106/484; 106/486; 106/487; 209/5; 241/24.1

(58) Field of Classification Search .............. 106/31.9, 106/31.6, 484, 486, 487, 488; 209/5
See application file for complete search history.

(56) References Cited

U.S. PATENT DOCUMENTS

| | | | | |
|---|---|---|---|---|
| 3,301,695 A | * | 1/1967 | Mercade | 106/488 |
| 3,337,048 A | * | 8/1967 | Mercade | 209/5 |
| 3,462,013 A | * | 8/1969 | Mercade | 209/5 |
| 3,655,038 A | * | 4/1972 | Mercade | 209/5 |
| 4,098,688 A | * | 7/1978 | Nott | 209/166 |
| 4,578,118 A | * | 3/1986 | Huege et al. | 106/486 |
| 4,738,726 A | | 4/1988 | Pratt et al. | |
| 4,935,391 A | * | 6/1990 | Caropreso et al. | 501/146 |
| 5,223,463 A | * | 6/1993 | Bilimoria et al. | 501/146 |
| 5,328,880 A | * | 7/1994 | Lampert et al. | 501/148 |
| 5,358,120 A | * | 10/1994 | Gantt et al. | 209/4 |
| 5,535,890 A | | 7/1996 | Behl et al. | |
| 5,593,490 A | | 1/1997 | Etheridge, Jr. et al. | 106/484 |
| 5,624,488 A | * | 4/1997 | Forbus et al. | 106/484 |
| 5,685,900 A | * | 11/1997 | Yuan et al. | 209/5 |
| 5,749,958 A | | 5/1998 | Behl et al. | |
| 5,938,833 A | | 8/1999 | Willis et al. | |
| 6,197,105 B1 | * | 3/2001 | Freeman et al. | 106/487 |
| 6,402,826 B1 | * | 6/2002 | Yuan et al. | 106/486 |
| 6,468,343 B1 | | 10/2002 | Pruett et al. | 106/486 |
| 6,660,076 B2 | | 12/2003 | Valadares et al. | |
| 2002/0161097 A1 | * | 10/2002 | Hen et al. | 524/447 |
| 2003/0141224 A1 | * | 7/2003 | Pruett et al. | 209/5 |
| 2003/0172846 A1 | * | 9/2003 | Valadares et al. | 106/486 |

* cited by examiner

*Primary Examiner*—J. A. Lorengo
*Assistant Examiner*—Pegah Parvini
(74) *Attorney, Agent, or Firm*—Bernard Lau

(57) ABSTRACT

Disclosed are methods of processing kaolin to produce two distinct grades of kaolin in a simultaneous manner. The methods involve processing kaolin by degritting a kaolin crude; subjecting the degritted kaolin crude to flotation to provide a kaolin having reduced titania content; ozonating the kaolin having reduced titania content; centrifuging the kaolin to provide a coarse stream and fine stream; refining the coarse stream into a coarse engineered kaolin pigment; and refining the fine stream into a fine glossing kaolin pigment. Also disclosed are systems for the automated processing of kaolin to produce two distinct grades of kaolin with real time feedback.

19 Claims, 3 Drawing Sheets

KAOLIN PIGMENTS AND METHODS OF MAKING THE SAME

FIELD OF THE INVENTION

The present invention generally relates to making two different grades of kaolin pigments from the same crude kaolin in a simplified process scheme. In particular, the present invention relates to making two different grades of kaolin pigments that are split apart only after substantial processing is performed.

BACKGROUND OF THE INVENTION

Kaolin is a fine, usually white clay formed by the weathering of aluminous minerals (as feldspar) and mainly consists of kaolinite. Kaolinite is commonly represented by one or more of the chemical formulae $Al_4Si_4O_{10}(OH)_8$; $Al_2O_3 \cdot 2SiO_2 \cdot 2H_2O$; and/or $Al_2Si_2O_5(OH)_4$. Kaolin is one of the many industrial minerals mined today. Reserves are found in Georgia (USA), Egypt, Brazil, United Kingdom, Queensland (Australia), Korea, China, and Ukraine.

Generally speaking, kaolin from different countries, and even different deposits within the same country, differs in many respects due to variations in a number of kaolinite properties. Examples of such properties include degree of crystallinity, coarseness, brightness, levels of other compounds such as titania and iron oxide, particle size, particle shape, size and/or shape distribution. Variations in properties leads to differences in performance of the resultant kaolin products. For example, crystallinity impacts resultant brightness, whiteness, opacity, gloss, and viscosity of the resultant products. It is noted that opacity and gloss are application performance parameters while the other listed parameters are pigment attribute parameters. Particle size, shape, and distribution impacts the smoothness, optical properties, and flow properties of the resultant products. Smoothness and optical properties are application performance parameters while flow properties are pigment attribute parameters.

The greatest demand for kaolin based products comes from the paper industry, which uses them to coat and fill papers and boards. However, kaolin based products include paints, agricultural compositions, fiberglass products, polymer and rubber compositions, ceramic applications, catalyst supports, pharmaceuticals, cosmetics, electrical components, adhesives, filter aids, and many more. Certain grades of kaolin having discrete properties are ideally suited for select applications. Accordingly, to maximize the quality of a resultant kaolin grade, kaolin crude is subjected to processing that yields a specifically desired grade of kaolin. Moreover, a specifically identified kaolin crude is often selected when a certain desired grade of kaolin is made, again to maximize the quality of that grade of kaolin.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides simplified processes for making two different grades of kaolin from a single kaolin crude. Consequently, the present invention eliminates the requirement of using independent processes to make separate grades of kaolin pigments. The present invention also mitigates the requirement of using different starting crudes with different characteristics in the independent processes to make separate grades of kaolin pigments.

One aspect of the invention relates to methods of processing kaolin involving degritting kaolin crude containing a major amount of gray kaolin, subjecting the degritted kaolin crude to flotation, ozonating the kaolin, centrifuging the kaolin to provide a coarse stream and fine stream, refining the coarse stream into a coarse engineered kaolin pigment, and refining the fine stream into a fine glossing kaolin pigment. Another aspect of the invention relates to systems and methods for the automated processing of kaolin, with optional real time feedback.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
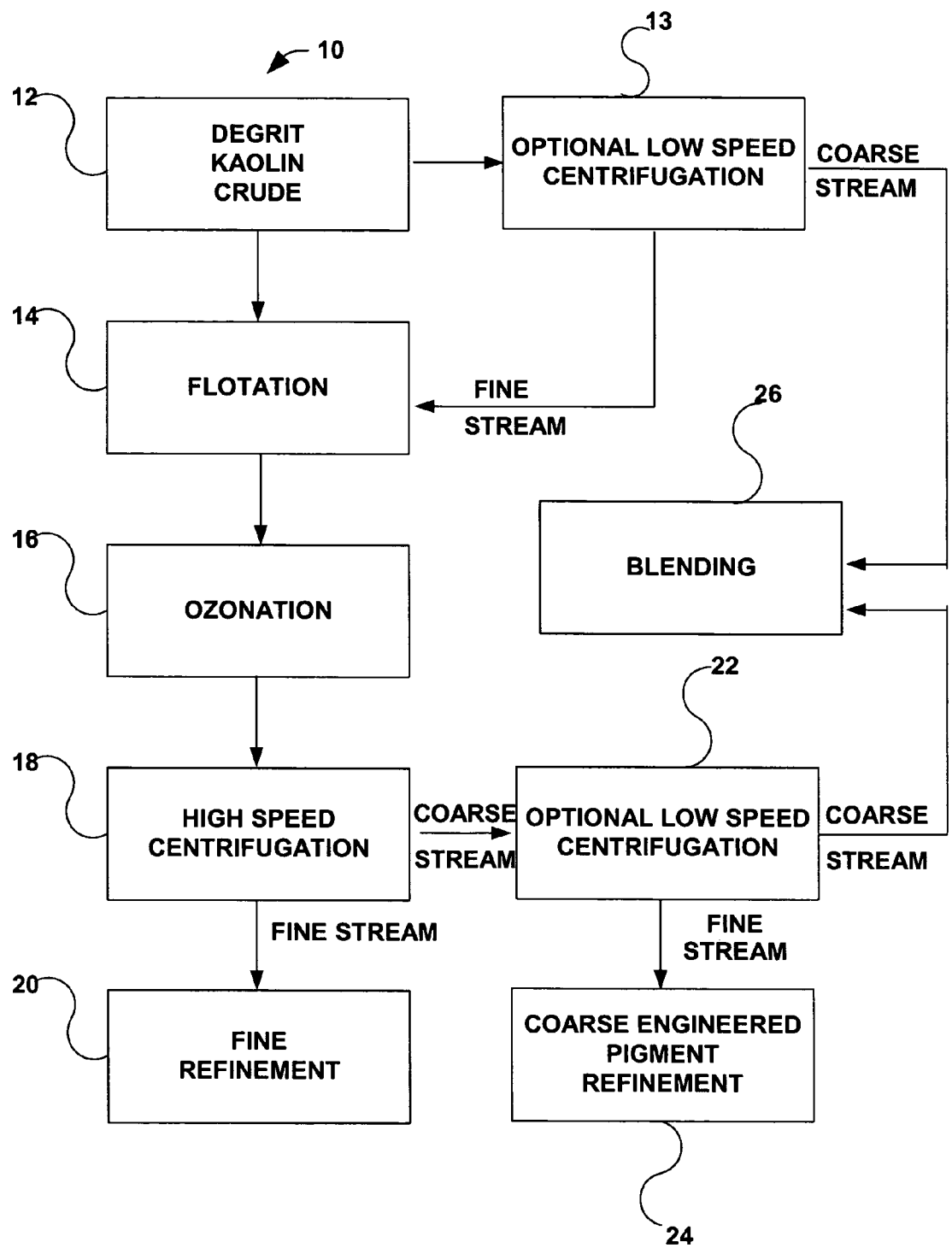
FIG. 1 is a flow diagram of one aspect of a system and method of processing kaolin in accordance with the present invention.

The methods of the present invention enable the production of two different grades of kaolin from a single kaolin crude. The two different grades of kaolin include coarse engineered kaolin pigment and fine glossing kaolin pigment. Coarse engineered kaolin pigments are characterized by low surface area, at least 80% by weight of the particles have a size of about 2 microns or less, and narrow particle size distribution. Fine glossing kaolin pigments are characterized by high brightness, excellent high shear viscosity, at least 80% by weight of the particles have a size of about 1 micron or less, and at least 95% by weight of the particles have a size of about 2 microns or less.

The methods of the present invention involve subjecting a kaolin crude to degritting, floatation, ozonation, and then high-speed centrifugation in a sequential manner to provide two discrete streams of kaolin. After high speed centrifugation, a low speed centrifugation act may be performed. A separate optional low speed centrifugation act may be performed before flotation which replaces the low speed centrifugation act after high-speed centrifugation. The two discrete streams of kaolin are independently processed to yield coarse engineered kaolin pigment and fine glossing kaolin pigment. Sequential means that degritting, floatation, ozonation, and centrifugation are performed in the order listed, although optionally other acts may be performed before, during and/or after the four sequential acts.

The kaolin crude that can be subjected to the methods of the present invention contains a major amount of gray or hard kaolin, a minor amount of fine white kaolin, and small amounts of nonkaolin particles. Nonkaolin particles include titania, quartz, various ferruginous minerals, mica, and non-kaolinitic clays such as bentonite and attapulgite. Major amounts include at least 50% by weight, minor amounts include less than 50% by weight, and small amounts include less than 10% by weight. In another embodiment, the kaolin crude contains at least about 60% by weight of gray or hard kaolin and less than about 40% by weight of fine white kaolin. In yet another embodiment, the kaolin crude contains at least about 70% by weight of gray or hard kaolin and less than about 30% by weight of fine white kaolin.

The kaolin crude contains particles wherein at least about 70% by weight have a particle size of about 2 microns or less, at least about 30% by weight have a particle size of about 0.3 microns or less, a titania content from about 1% to about 3% by weight, and a surface area of at least about 18 $m^2/g$. In another embodiment, the kaolin crude contains particles wherein at least about 80% by weight have a particle size of about 2 microns or less, at least about 35% by weight have a particle size of about 0.3 microns or less, a titania content from about 1.5% to about 2.5% by weight, and a surface area of at least about 20 $m^2/g$.

Prior to processing the kaolin crude, a slurry may be formed by combining the kaolin crude with water, and optionally a dispersant. One advantage to the present invention is that a dispersant may not be required before separate streams of distinct kaolin grades are separated. Thus, in one embodiment, a dispersant is not employed until separate streams of distinct kaolin grades are separated.

The dispersant may be an organic dispersant or inorganic dispersant. Inorganic dispersant typically include phosphate salts. Examples of phosphate salts include inorganic polyphosphates and pyrophosphates (which are actually a type of polyphosphate), such as sodium hexametaphosphate (SHMP), sodium tripolyphosphate (STPP) and tetrasodium pyrophosphate (TSPP).

Organic dispersants typically include ammonia-based dispersants, sulfonate dispersants, carboxylic acid dispersants, and polymeric dispersants, such as polyacrylate dispersants, as well as other organic dispersants conventionally employed in kaolin pigment processing.

The kaolin crude is first subjected to degritting. Kaolin crude occurs as an ore that contains grit, grit composed a relatively large particles. The grit is undesirable and thus is removed. The resulting degritted crude kaolin is composed largely of kaolin particles that usually have a wide range of sizes ranging from slimes (finer than 0.3 microns) up to about 15 microns.

Degritting is performed in any conventional manner using one or more of sieves, sandboxes, gravity settling, or hydrocyclones. Either wet or dry degritting may be employed. For example, degritting may be performed by combining the crude kaolin with water and passing the slurried mixture through a sieve, such as a 325 mesh sieve or a 200 mesh sieve. Optionally, a clay dispersant is also added to the slurry to provide additional fluidity to facilitate the degritting process. Examples of clay dispersants include ammonia-based dispersants, phosphate-based dispersants, sulfonate dispersants, carboxylic acid dispersants, and polymeric dispersants, such as polyacrylate dispersants, as well as other organic dispersants employed in kaolin pigment processing. The amount of dispersant used in the slurry is typically from about 0.01% to about 1% based on the weight of crude kaolin.

After degritting the crude kaolin, the resulting degritted crude kaolin is subjected to flotation. Flotation serves to reduce the titania content to less than about 1% by weight and/or reduce the iron oxide content to less than about 1.5% by weight. In another embodiment, flotation reduces the titania content to less than about 0.7% by weight and/or reduce the iron oxide content to less than about 1.25% by weight. In yet another embodiment, flotation reduces the titania content to less than about 0.5% by weight and/or reduce the iron oxide content to less than about 1% by weight. In still yet another embodiment, flotation reduces the titania content to less than about 0.4% by weight and/or reduce the iron oxide content to less than about 0.75% by weight. The degritted crude may be centrifuged prior to flotation to control the particle size distribution such that the subsequent high speed centrifuge operation results in desired coarse particle size distribution that does not require a further centrifuge act.

Flotation is performed in any conventional manner including wet flotation, ultraflotation, froth flotation, TREP flotation (titania removal and extraction process), and the like. General methods of flotation are described in Mathur, S., "Kaolin Flotation", Journal of Colloid and Interface Science, 256, pp. 153-158, 2002, which is hereby incorporated by reference in this regard. Ultraflotation involves using a particulate reagent with a fatty acid and selected flotation oils to remove titania from a slurry of impure clay. One characteristic of ultraflotation is that the purified kaolin is recovered as a dilute slurry that is subsequently dewatered. Froth flotation functions by separating certain mineral particles from other particles in a slurry based on differences in the mineral species. The processing generally depends upon adding reagents that selectively attach to mineral particles to be floated, whereby the particles with attached reagent(s) have a greater affinity for air bubbles than other particles and can be removed as a froth. TREP flotation involves conditioning kaolin in a high intensity mill using a collector, such as a fatty acid collector, tall oil collector, or an hydroxamate collector, and a metal salt. This is followed by the addition of a dispersant, such as an acrylate salt dispersant. Optionally, magnetic separation or selective flocculation can also be used for improving brightness stand alone or in conjunction with flotation.

Flotation may be performed at any suitable solids content, pH, and temperature using a slurry of the degritted kaolin crude and water. In one embodiment, during flotation at least one of the following parameters are satisfied: the solids content is from about 10% to about 50%, the pH is from about 5 to about 11, and the temperature is from about 10° C. to about 90° C. In another embodiment, during flotation at least one of the following parameters are satisfied: the solids content is from about 20% to about 40%, the pH is from about 6 to about 10, and the temperature is from about 20° C. to about 60° C.

After flotation, the kaolin undergoing processing is subjected to ozonation. Ozonation involves oxidative bleaching, using ozone, in order to bleach components, such as organic discolorants, that may be present. The ozone acts not only to destroy substantial portions of discoloring organics, but also destroys by oxidation the organic dispersant, if such a compound is present. However, the ozone does not destroy inorganic dispersants.

Ozonation is performed in any suitable manner. For example, ozonation may be performed at a dosage level from about 0.1 to about 20 pounds of ozone per ton of kaolin. In another embodiment, ozonation is performed at a dosage level from about 0.5 to about 10 pounds of ozone per ton of kaolin. The ozone may be applied as a stream of bubbles which can be passed upwardly through the slurry. This can be a batch process or a continuous process in which the ozone bubbles pass counter current to a flow of the slurry in a pipe or other conduit, such as mixed and packed column.

After ozonation, the ozonated kaolin is subjected to optional delamination. Delamination can involve wet milling, slurry milling, wet grinding, and the like. Such delamination processes involve the use of a grinding media and water. Kaolin is combined with the grinding media and water to form a slurry and transported, such as by pumping, through the delamination equipment. Typically, the kaolin solids in the slurry during delamination are from about 5% to about 50% by weight.

After ozonation, high-speed centrifugation is employed to separate the ozonated kaolin into two streams. It is noted that the high-speed centrifugation is performed after degritting, flotation, and ozonation. Centrifugation separates the ozonated kaolin into a coarse stream (at least about 70% by weight of the particles have a size of 2 microns or less) and a fine stream (at least about 80% by weight of the particles have a size of 1 micron or less). In another embodiment, the coarse stream has at least about 80% by weight of the particles have a size of 2 microns or less and the fine stream has at least about 85% by weight of the particles have a size of 1 micron or less. In yet another embodiment, the coarse stream has at least about 90% by weight of the particles have a size of 2 microns or less and the fine stream has at least about 90% by weight of the particles have a size of 1 micron or less.

All particle sizes referred to herein are determined by a conventional sedimentation technique using a Micromeretics, Inc.'s SEDIGRAPH® 5100 analyzer analysis. The sizes, in microns, are reported as "e.s.d." (equivalent spherical diameter). Particles are slurried in water with a dispersant and pumped through the detector with agitation to disperse loose agglomerates.

Centrifugation may be conducted twice, but one centrifugation treatment is a high-speed centrifugation treatment immediately following ozonation. The second centrifugation treatment may be performed by subjecting the coarse stream to a second centrifugation treatment after the high-speed centrifugation treatment or by performing another centrifugation treatment prior to flotation. Centrifugation may be conducted three times by subjecting the coarse stream from the second centrifugation treatment to a third centrifugation treatment, then combining the third fine stream with at least one of the first and second fine streams.

In a high-speed centrifugation treatment the centrifuge may operate at "g" forces from above about 2,000 to about 10,000 while in a low speed centrifugation treatment the centrifuge may operate at "g" forces from about 200 to about 2,000. In another embodiment, the high-speed centrifugation treatment the centrifuge may operate at "g" forces from about 2,500 to about 7,500 while in the low speed centrifugation treatment the centrifuge may operate at "g" forces from about 500 to about 1,750. In yet another embodiment, the high-speed centrifugation treatment the centrifuge may operate at "g" forces from above about 3,000 to about 5,000 while in the low speed centrifugation treatment the centrifuge may operate at "g" forces from about 800 to about 1,500. Examples of centrifuges include Bird solid bowl machines, Alfa Laval nozzle bowl high-speed centrifuges, horizontal three-phase centrifuges, and the like.

The coarse stream is then subject to refining, which may involve at least one of bleaching, filtering, bulking, spray drying, and blending. Generally, bleaching involves increasing the brightness of the kaolin. Bleaching involves contacting the coarse kaolin stream with a suitable amount of one or more of hydrosulfite (dithionite) salts, potassium permanganate, oxygen gas, alkali bichromates, alkali chlorates, alkali chlorites, ammonium persulfate and soluble peroxides such as sodium and hydrogen peroxide, sodium hypochlorite, and the like.

Filtration can be employed to increase solids content (for example increase solids content to about 55% or higher). Increasing the solids content in some instances improves the efficiency of a subsequent spray drying operation. Filtration can be carried out in any suitable manner and is typically carried out using rotary drum vacuum filters.

Spray drying the coarse kaolin is performed to reduce the moisture level of the coarse kaolin. Drying the coarse kaolin may facilitate optional, subsequent heat treatments. In one embodiment, after drying the coarse kaolin has a moisture level of less than about 1.5% by weight. In another embodiment, after drying the coarse kaolin has a moisture level of less than about 1% by weight. In yet another embodiment, after drying the coarse kaolin has a moisture level of less than about 0.5% by weight.

Blending involves combining the coarse kaolin with other particulate matter, such as a different batch of kaolin, titania, other clays, calcium carbonate, calcined kaolin, and the like to arrive at a mixture that has properties desired by the end user or a subsequent user.

The coarse kaolin pigment product has numerous desirable properties. For example, the coarse kaolin pigment product has one or more of at least about 95% by weight of the particles have a size of 5 microns or less, at least about 80% by weight of the particles have a size of 2 microns or less, at least about 20% by weight of the particles have a size of 0.3 microns or less, a surface area from about 14 to about 20 $m^2/g$, about 1% by weight or less of titania, about 1.5% by weight or less of iron oxide, and a brightness of about 85 or more. In another embodiment, the coarse kaolin pigment product has one or more of at least about 96% by weight of the particles have a size of 5 microns or less, at least about 90% by weight of the particles have a size of 2 microns or less, at least about 25% by weight of the particles have a size of 0.3 microns or less, a surface area from about 15 to about 19 $m^2/g$, about 0.75% by weight or less of titania, about 1.25% by weight or less of iron oxide, and a brightness of about 87.5 or more. In yet another embodiment, the coarse kaolin pigment product has one or more of at least about 97% by weight of the particles have a size of 5 microns or less, at least about 95% by weight of the particles have a size of 2 microns or less, from about 27% to about 33% by weight of the particles have a size of 0.3 microns or less, a surface area from about 16 to about 19 $m^2/g$, about 0.5% by weight or less of titania, about 1% by weight or less of iron oxide, and a brightness of about 89 or more.

The fine stream is then subject to refining, which may involve at least one of bleaching, filtering, drying, and blending. Filtration can be employed to increase the solids content to about 55% or higher to improve the efficacy of the subsequent spray drying operation. Filtration can be carried out in any suitable manner. Bleaching is described in connection with the coarse stream and is not repeated here for brevity.

Drying the fine stream kaolin is performed to reduce the moisture level of the kaolin, in part, to facilitate subsequent procedures/treatments. In one embodiment, after drying, the fine stream kaolin has a moisture level of less than about 1.5% by weight. In another embodiment, the fine stream kaolin has a moisture level of less than about 1% by weight. In yet another embodiment, the fine stream kaolin has a moisture level of less than about 0.5% by weight.

Blending involves combining the fine kaolin with other particulate matter, such as a different batch of kaolin, titania, other clays, calcium carbonate, calcined kaolin, and the like to arrive at a mixture that has properties desired by the end user or a subsequent user.

The fine glossing kaolin pigment product has numerous desirable properties. For example, the fine glossing kaolin pigment product has one or more of at least about 80% by weight of the particles have a size of 1 micron or less, at least about 95% by weight of the particles have a size of 2 microns or less, at least about 97% by weight of the particles have a size of 5 microns or less, from about 60% to about 85% of the particles have a size of 0.3 microns or less, a surface area from about 21 to about 30 $m^2/g$, about 0.75% by weight or less of titania, about 1.5% by weight or less of iron oxide, brightness of about 87.5 or more, and high shear viscosity of about 20 dynes/4400 rpm or less. In another embodiment, the fine glossing kaolin pigment product has one or more of at least about 90% by weight of the particles have a size of 1 micron or less, at least about 97% by weight of the particles have a size of 2 microns or less, at least about 98% by weight of the particles have a size of 5 microns or less, from about 65% to about 80% of the particles have a size of 0.3 microns or less, a surface area from about 22 to about 29 $m^2/g$, about 0.5% by weight or less of titania, about 1.25% by weight or less of iron oxide, brightness of about 90 or more, and high shear viscosity of about 15 dynes/4400 rpm or less. In yet another embodiment, the fine glossing kaolin pigment product has one or more of at least about 95% by weight of the particles have a size of 1 micron or less, at least about 99% by weight of the particles have a size of 2 microns or less, at least about 99.9% by weight of the particles have a size of 5 microns or less, from about 70% to about 75% of the particles have a size of 0.3 microns or less, a surface area from about 23 to about 28 $m^2/g$, about 0.4% by weight or less of titania, about 1% by weight or less of iron oxide, brightness of about 91 or more, and high shear viscosity of about 10 dynes/4400 rpm or less.

Surface area is determined by the art recognized BET method using $N_2$ as the adsorbate. Surface area alternatively is determined using Gardner Coleman Oil Absorption Test is based on ASTM D-1483-84 which measures grams of oil absorbed per 100 grams of kaolin. Brightness measurements are performed using the TAPPI standard method, T524, and are reported as "GE brightness" or "GEB values".

Generally speaking, one or more conventional clay processing steps such as crushing, grinding, selective flocculation, delamination, magnetic separation, floc/filtration, heat treatment, and the like, may be employed before or after the methods of the present invention.

Crushing reduces kaolin rock to gravel; that is, kaolin rock having diameters of less than about 10 cm in diameter. Grinding involves processing crude kaolin to achieve a desired particle size distribution. Grinding may be carried out by dry milling, dry ball milling, dry grinding, and the like.

Kaolin contains naturally separated platy kaolin particles as well as "booklets", which comprise stacks of kaolin platelets. These stacks are concentrated in particles having a size of about 2 or more microns. Delamination of these booklets involves providing impact energy which is just sufficient to cleave apart the kaolin platelets that make up the booklets without further fracturing the kaolin platelets. Delamination can involve wet milling, slurry milling, wet grinding, and the like. Such optional delamination processes involve the use of a grinding media and water. Kaolin is combined with the grinding media and water to form a slurry and transported, such as by pumping, through the delamination equipment. Typically, the kaolin solids in the slurry during delamination is from about 5% to about 50% by weight.

Kaolin may be optionally subjected to one or more heat treatments. When kaolin is heated, it undergoes a series of characteristic changes, detectable by various methods including differential thermal analysis (DTA). Heat treatment may be employed to form one or more of metakaolin, partially calcined kaolin, and calcined kaolin, depending on the temperatrure/duration of the heat treatment. Heat treatment is performed under one of an inert atmosphere, an oxidizing atmosphere, and a reducing atmosphere.

For example, after heating from about 450 to about 650° C. for a sufficient period of time, kaolin undergoes a strongly endothermic dehydration reaction resulting in the conversion to material known as metakaolin. The metakaolin state is conveniently ascertained by acid solubility testing because the alumina in the clay is virtually completely soluble in strong mineral acid.

Calcining destroys the crystallinity of hydrous kaolin and renders the kaolin substantially amorphous. Calcination occurs after heating at temperatures in the range from about 700 to about 1200° C. for a sufficient period of time. Commercial vertical and horizontal rotary calciners can be used to produce metakaolin, partially calcined kaolin, and/or calcined kaolin. Operation is controlled to avoid calcining at sufficiently high temperatures to form unwanted mullite ($3Al_2O_3.SiO_2$).

Referring to FIG. 1, a high level diagram of various aspects of a kaolin processing methodology 10 is shown. In act 12, kaolin crude is degritted, removing relatively large particles from the kaolin crude. After relatively large particles are removed from the kaolin crude, act 14 involves flotation to reduce the amount of at least one of titania and/or iron oxide in the degritted kaolin. Optionally, act 13 involves a low speed centrifugation thereby separating the kaolin into two different grades/streams, where the fine stream is then sent to flotation 14 and the coarse stream sent to blending 26. Act 16 involves ozonating the kaolin. After ozonation, act 18 involves centrifuging at high speeds the kaolin and thereby separating the kaolin into two different grades/streams. The coarse stream produced by act 18 is optionally subjected to another centrifugation at low speed in act 22, further producing two different grades/streams. In act 20, the fine stream from acts 18 is subject to refinement to produce fine glossing kaolin pigments. The coarse stream from act 18 and fine stream from act 22 is subject to refinement to produce coarse engineered kaolin pigments. The coarse stream from act 22 is subject to blending 26 with other materials.

Figure 2:
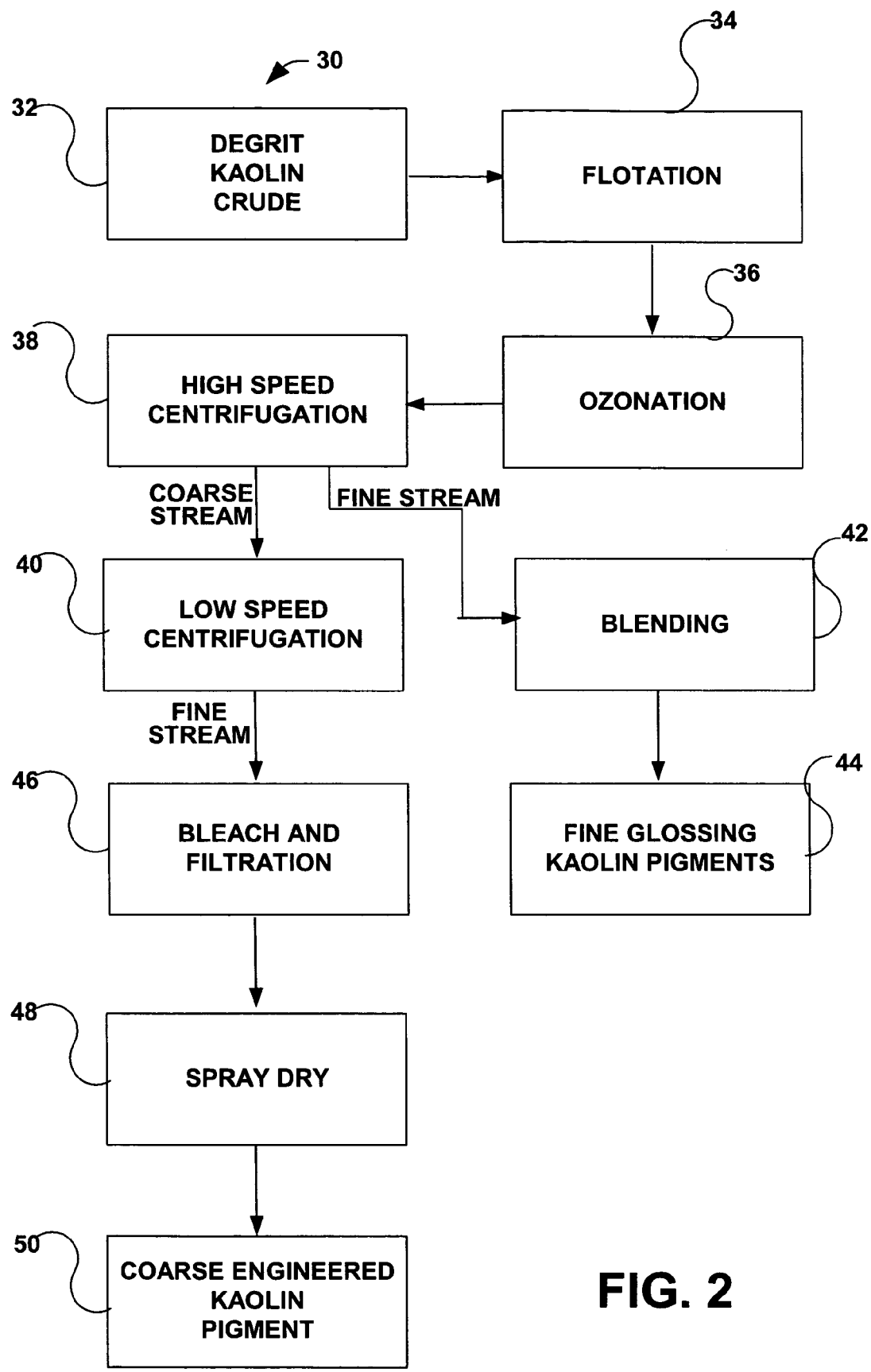
FIG. 2 is a flow diagram of another aspect of a system and method of processing kaolin in accordance with the present invention.

Referring to FIG. 2, a more detailed diagram of various aspects of a kaolin processing methodology 30 is shown. In act 32, kaolin crude is degritted, followed by act 34 involving flotation to reduce the amount of at least one of titania and/or iron oxide in the degritted kaolin. Act 36 involves ozonating the kaolin, then act 38 involves centrifuging at high speeds the kaolin and thereby separating the kaolin into two different grades/streams; namely, a coarse stream and fine stream. The coarse stream produced by act 38 is optionally subjected to another centrifugation at low speeds in act 40, further producing another coarse stream and another fine stream.

In act 42, the fine stream from act 38 is subjected to bleachng, filtration, drying, and/or blending in act 42, to produce fine glossing kaolin pigments in act 44. The coarse stream from act 38 and the fine stream from act 40 are subject to bleaching and filtration in act 46. The bleached and filtered kaolin is then dried in act 48 to produce coarse engineered kaolin pigments in act 50.

Figure 3:
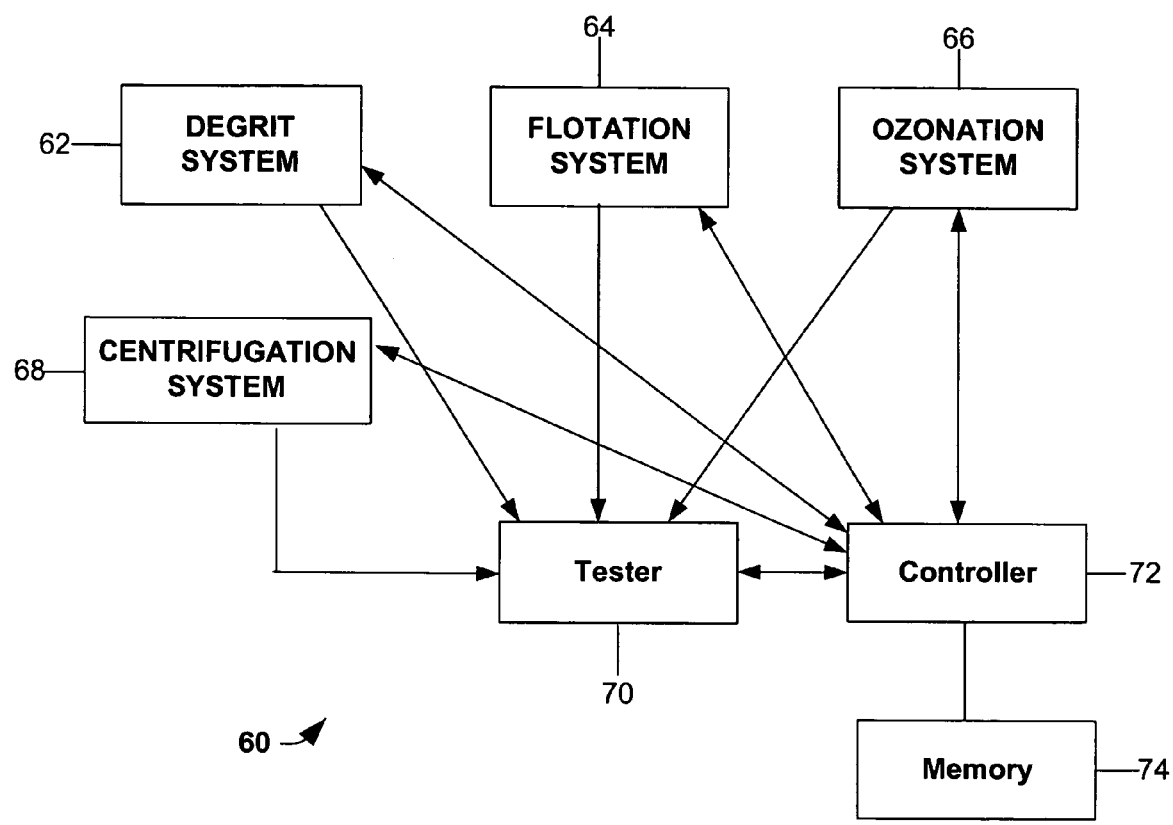
FIG. 3 is a schematic diagram of another aspect of a system for automated processing of kaolin in accordance with the present invention.

Referring to FIG. 3, a system 60 to process kaolin crude into two fractions is described is shown. The system includes one or more of a 62, a flotation system 64, ozonation system 66, and cetrifugation system 68 (high speed and/or low speed centrifuges) coupled to a tester 70 and a controller 72. The degrit system 62 processes kaolin by removing large grit from the kaolin crude, the flotation system 64 reduces the titania and or iron oxide content of the degritted kaolin, the ozonation system 66 oxidizes species within the kaolin process stream, and the cetrifugation system 68 separates two distinct kaolin streams from each other. The tester 70 can be any device that measures at least one parameter associated with the kaolin (such as particle size distribution, brightness, whiteness, roughness, % moisture content, % content of particular chemical such as titania, and the like) or any parameter associated with any one of the degrit system 62, flotation system 64, ozonation system 66, and cetrifugation system 68 (such as the particle size and/or "g" force with the cetrifugation system 68).

While any one of the degrit system 62, flotation system 64, ozonation system 66, and cetrifugation system 68 are operating, the tester 70 tests the kaolin being processed. For example, while the degrit system 62, flotation system 64, or ozonation system 66 is operating, a sample of kaolin may be withdrawn and tested to determine a parameter, such as particle size distribution. The tester 70 sends the data generated by the testing to the controller 72, which is adapted to receive such kaolin parameter data from the tester 70. Alternatively, the tester 70 may measure a parameter of the degrit system 62, flotation system 64, ozonation system 66, and cetrifugation system 68, and send data associated with the parameter to the controller.

The controller 72 analyzes such data, and based on the analysis, sends a signal to any of the degrit system 62, flotation system 64, ozonation system 66, and cetrifugation system 68 to either continue the process, modify the process, or terminate the process. To facilitate such analysis, a data store or memory 74 may be coupled to the controller 72 so that the controller 72 can compare data sent by the tester 70 to stored data. The controller 72 may send a signal to the tester 70 to perform a test. Examples of ways in which the controller 72 can modify a process include increasing or decreasing the "g" forces in the cetrifugation system 68; increasing or decreasing the temperature in the flotation system 64; increasing or decreasing the work/energy required by any of the degrit system 62, flotation system 64, ozonation system 66, and/or cetrifugation system 68; continue operating any of the degrit system 62, flotation system 64, or ozonation system 66 to achieve a certain desired particle size distribution; and the like. Consequently, the system 60 can provide real time analysis and real time feed back, so that the processing of kaolin can be modified in real time to suit immediately existing needs.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

Table 1 shows the characteristics of the crude that is subjected to the methods of the present invention.

TABLE 1

| Property | Values |
| --- | --- |
| GE Brightness | 82.6 |
| Surface area minimum | 20 m$^2$/g |
| % TiO$_2$ | 1.81 |
| % Fe$_2$O$_3$ | 0.90 |
| Particle size, % mass finer than | |
| 2 microns | 82 |
| 0.3 micron | 38 |

EXAMPLE 2

The crude from Example 1 is subjected to degritting, ultra-flotation, ozonation, and centrifuge separation to result in a fine stream and a coarse stream. The flotation is conducted so as to reduce the TiO$_2$ content to less that 0.7%. The centrifuge is operated under conditions to target 18-22%<0.3 micron particle size which results in 74-78%<2 microns particle size. The coarse is further subjected to a centrifuge act so as to recover 90%<2 μm particles, that form the basis for making the coarse engineered pigment. The characteristics of the coarse following a second centrifuge act, where the coarsest particles are rejected thereby fining up the stream, and the fines stream from the first centrifuge act are shown in Table 2.

TABLE 2

| Property | Coarse | Fines |
| --- | --- | --- |
| GE Brightness | 87.4 | 91.2 |
| Surface area m$^2$/g | 17.3 | 26.2 |
| % TiO$_2$ | 0.44 | 0.29 |
| % Fe$_2$O$_3$ | 0.86 | 0.89 |
| Particle size, % mass finer than | | |
| 2 microns | 89 | 100 |
| 0.3 microns | 28 | 71 |

EXAMPLE 3

The coarse stream in Table 2 is flocced using sulfuric acid, bleached and filtered. The filter cake is dispersed with Colloid 154 to pH 6.0, spray dried slurried to 70% solids, treated with 1.5#/t (0.075% active based on dry weight of kaolin) of a cationic polymer Sharpefloc™ 26 (epichlorohydrin polyamine) and additional Colloid 154 (0.1% based on dry kaolin) is added to optimize the dispersion.

The characteristics of the coarse product (Coarse I) along with a comparison of a comparative coarse engineered kaolin pigment (Comparative I) are provided below in Table 3. The commercial coarse engineered pigment is prepared by degritting, fractionation, ultraflotation, ozonation, flocculation, and spray drying.

TABLE 3

| Properties | Comparative 1 | Coarse 1 |
|---|---|---|
| Solids, % | 68.1 | 68 |
| pH | 6.7 | 6.4 |
| Brookfield viscosity | 278 | 614 |
| Hercules viscosity | 381/16 | 335/16 |
| Surface Area m$^2$/g | 12.4 | 17.5 |
| TAPPI Brightness, % | 90.7 | 90.5 |
| Particle Size Distribution Mass % finer than | | |
| 5 micron | 99 | 99 |
| 2 micron | 88 | 90 |
| 1 micron | 71 | 76 |
| 0.3 micron | 22 | 31 |
| Median micron | 0.58 | 0.48 |

According to conventional wisdom, a narrow particle size distribution and low surface area (less than 14 m$^2$/g) results in improved hiding and thus improved sheet brightness and opacity. Thus, it is not expected for Coarse I to provide the same performance as Comparative I in application testing.

The two pigments are evaluated on a pilot coater trial. The coating color is applied to a LWC (light weight coated) base stock on a pilot coater a meter size press application and super-calendered to achieve target 45 gloss with the comparative 1 pigment.

The coating color formulation is:

| | |
|---|---|
| Comparative 1 or Coarse 1 (hydrous kaolin) | 89 parts |
| Ansilex ® 93 (calcined kaolin) | 6 parts |
| Albagloss S (precipitated calcium carbonate) | 5 parts |
| Dow Latex FC1060 | 9 parts per 100 parts pigment |
| Penford 80 starch | 9 parts per 100 parts pigment |
| Lubricant-Sequaflow 565 | 1 part per 100 parts pigment |
| Insolubilizer-Sequarez 755 | 0.5 parts per 100 parts pigment |
| Coating color solids | 59% |
| pH | 8.5 |

The coating color is applied to a LWC basestock on a pilot coater using a meter size press application and supercalendered to achieve target 45 gloss with the comparative 1 pigment. The sheet properties are described in Table 4.

TABLE 4

| | Comparative 1 | Coarse 1 |
|---|---|---|
| coat weight (gsm) | 12.8 | 12.7 |
| Sheet gloss (%) | 45 | 46 |
| TAPPI Brightness (%) | 72.5 | 73.0 |
| TAPPI Opacity (%) | 86.4 | 87 |
| smoothness - Parker Print Surf | | |
| Soft backing, 10 kgf/cm$^2$ (micron) | 2.1 | 1.9 |

Thus, surprisingly, the Coarse I product of the present invention results in sheet properties that are better than the Comparative 1 which is based on accepted design rules of engineered products, for instance, delamination, narrow particle size distribution and a low surface area. The Coarse I product is bulked but unlike Comparative 1, the cationic polymer is added to filter product or high solids slurry. Also, the particle size distribution of Coarse 1 is narrower, and the surface area is higher than Comparative 1.

EXAMPLE 4

Coarse II pigment is prepared following the procedures of Examples 2 and 3 (but not the same batch) and compared in application with a delaminated pigment (Comparative 2) with a significantly lower surface area and bulked with the same dosage of the SF26 polymer—1.5#/t (based on weight of dry clay) the polymer can be added to the delaminated product or to the high solids slurry without a negative impact on application perfromance. Comparative II is obtained is prepared by forming a deflocculated aqueous suspension, gravity sedimentation separation, bleaching, filtering, delaminating, and then spray drying the kaolin. The delamination and slightly coarser particle size of Comparative II is expected to improve rotogravure printability. The physical properties of Comparative II and Coarse II pigments are shown in Table 5 below.

TABLE 5

| Properties | Comparative II | Coarse II |
|---|---|---|
| Solids, % | 66.8 | 67.2 |
| pH | 6.3 | 6.3 |
| Brookfield viscosity | 220 | 344 |
| Hercules viscosity | 411/16 | 513/16 |
| Surface Area (m2/g) | 12.2 | 16.5 |
| TAPPI Brightness, % | 90.0 | 90.2 |
| Particle Size Distribution Mass % finer than | | |
| 5 microns | 98 | 99 |
| 2 microns | 85 | 91 |
| 1 micron | 65 | 79 |
| 0.3 micron | 19 | 27 |
| Median (micron) | 0.67 | 0.49 |

The coating color formulation is:

| | |
|---|---|
| Comparative II or Coarse II (hydrous kaolin) | 90 parts |
| Ansilex ® 93 | 10 parts |
| Gen Flo 5190 binder | 6 parts per 100 parts pigment |
| Sunkote 455 | 0.80 parts per 100 parts pigment |
| Alcogum L29 | 0.76 parts per 100 parts pigment |
| Coating color solids | 59% |
| pH | 8.5 |

The coating color is applied to a LWC rotogravure base stock on a CLC and lab calendared to achieve target 50-55 gloss with the Comparative II pigment. The sheet and print optical properties are shown in Table 6.

TABLE 6

| | Comparative II | Coarse II |
|---|---|---|
| Coat Weight (gsm) | 7.5 | 7.5 |
| Sheet gloss (%) | 53 | 57 |
| TAPPI Brightness (%) | 73.7 | 73.5 |
| TAPPI Opacity (%) | 84.6 | 84.3 |
| Smoothness - Parker Print Surf | | |
| Soft backing, 10 kgf/cm$^2$ (micron) | 0.83 | 0.76 |
| Heliotest (mm) pressure-35 kgf | | |
| Backing-hard | 52 | 55 |

The pigment of the invention results in a higher gloss at comparable rotogravure printabilty, as measured by the Helio test, and sheet brightness and opacity when compared with the comparative pigment.

EXAMPLE 5

The pigments from Example 3 are tested in a pilot coater trial. The application is MWC (medium weight coated) offset, 45# #4 Grade paper.

The coating color formulation is:

| | |
|---|---|
| Comparative II or Coarse II (hydrous kaolin) | 66 parts |
| Ground Calcium Carbonate - Hydrocarb 90 | 25 parts |
| TiO$_2$-Dupont Vantage | 9 parts |
| Dow 692A binder | 9 parts per 100 parts pigment |
| Penford PG280 starch | 7 parts per 100 parts pigment |
| Crosslinker-Berset 2720 | 0.5 parts per 100 parts pigment |
| Devflo50 | 1 part per 100 parts pigment |
| Coating color solids | 59% |
| pH | 8.5 |

The coating color is applied to a MWC base stock on a pilot coater at 1100 m/min and supercalendared to achieve target gloss with the Comparative II pigment. The following are the sheet and print optical properties (Table 7).

TABLE 7

| | Commercial II | Coarse II |
|---|---|---|
| Coat Weight (gsm) | 22.0 | 22.3 |
| Sheet gloss, (%) | 60 | 66 |
| TAPPI Brightness (%) | 82.4 | 82.2 |
| TAPPI Opacity (%) | 91 | 91.4 |
| Smoothness - Parker Print Surf | | |
| Soft backing, 10 kgf/cm$^2$ (micron) | 1.07 | 0.98 |
| Prufbau Print Gloss, % | 73 | 76 |

The pigment of the present invention provides surprising results on sheet and print optical properties when compared with the comparative product.

EXAMPLE 6

The fines prepared in accordance with the process of Example 2 are flocced using sulfuric acid, bleached and filtered and redispersed and spray dried. The spray dried product is slurried to 70% solids. The pigment is denoted as Fines I. Table 8 shows the physical properties of the product and a comparison with a commercial fine glossing pigment (Commercial I—Miragloss™ 91 available from Engelhard Corporation).

TABLE 8

| | Commercial I | Fines 1 |
|---|---|---|
| Properties | | |
| Solids, % | 70 | 70 |
| pH | 6.8 | 7.1 |
| Brookfield viscosity | 440 | 850 |

TABLE 8-continued

| | Commercial I | Fines 1 |
|---|---|---|
| Hercules viscosity, dynes/4400 rpm | 5.2 | 2520 rpm/64 dynes |
| Surface Area (m$^2$/g) | 22.5 | 26 |
| TAPPI Brightness, % | 91.3 | 91.7 |
| Particle Size Distribution Mass % finer than | | |
| 2 microns | 99 | 99 |
| 1 micron | 96 | 98 |
| 0.5 micron | 88 | 92 |
| 0.3 micron | 66 | 72 |

The Fines I sample exhibits higher low shear viscosity and also significantly poorer high shear viscosity than the commercial pigment. The higher content of fines and surface area in Fines I pigment explains why the Brookfield viscosity is higher than the commercial pigment. However, based on the broader particle size distribution curve for Fines I sample, a better high shear viscosity is expected since packing efficiency ought to be better than the Commercial I pigment. However, the Sedigraph equipment measures the equivalent Stokes diameter and therefore it is possible that the particles in Commercial I have a different morphology (for example, lower aspect ratio) than particles in Fines I so that improved viscosity is obtained. When the Fines I sample is blended at 40% level with the Commercial I sample, surprisingly, the high shear viscosity is similar to Commercial I samples as shown in Table 9 below. The blends between 40/60 and 0/100 of Fines 1/Commercial I are similar to Commercial I physical properties. Above 40% of the Fines I, the product's high shear viscosity tends to increase such that the specification of max 7 dynes/4400 rpm is not typically met.

TABLE 9

| | Commercial 1/Fines 1 in 60/40 blend ratio |
|---|---|
| Properties | |
| Solids, % | 70 |
| pH | 7 |
| Brookfield viscosity | 610 |
| Hercules viscosity, dynes/4400 rpm | 7 |
| Surface Area (m$^2$/g) | 23 |
| TAPPI Brightness, % | 91.1 |
| Particle Size Distribution Mass % finer than | |
| 2 microns | 99 |
| 1 micron | 96 |
| 0.5 micron | 89 |
| 0.3 micron | 68 |

Thus, blending of the two products (or appropriate in-process streams) processed through different methodologies that may differ in kaolin morphology or aspect ratio result in a product that is similar to one of the products that is desired. By doing so, the cost of the desired product can be significantly reduced since the starting material from which the other fine product is processed is lower cost and the coarse particles generated as by-product are usable as a coarse engineered particle size product.

EXAMPLE 7

Fines I is blended with a product (Commercial IV)—premium brightness #2 clay, Ultracote™ 90) with a different morphology than that derived from the Fines. The characteristics of each of the products along with the blend are shown in Table 10. The physical properties of the product are similar to Miragoss™ OP (Commercial V) with better pigment brightness for the blended pigment of the invention.

TABLE 10

|  | Fines I | Comm IV | Fines II/Comm IV (70/30) | Comm V |
|---|---|---|---|---|
| Properties |  |  |  |  |
| Solids, % | 70 | 70 | 70 | 70 |
| pH | 7.6 | 6.3 | 6.3 | 6.7 |
| Brookfield visc | 900 | 300 | 478 | 275 |
| surface area ($m^2/g$) | 25 | 15 | 22 | 21 |
| TAPPI Bright % | 92.3 | 90.0 | 91.0 | 90.5 |
| Particle Size Dist |  |  |  |  |
| Mass % finer than |  |  |  |  |
| 2 micron | 98 | 79 | 94 | 95 |
| 1 micron | 98 | 67 | 89 | 90 |
| 0.5 micron | 91 | 49 | 80 | 75 |
| 0.3 micron | 71 | 31 | 60 | 59 |
| Herc visc dynes/4400 rpm | 3640/64 (2 dynes/ 1100 rpm) | * (7 dynes/ 1100 rpm) | 18 | 14 |

The mixed pigments are expected to be worse than Fines I based on high shear viscosity measurements at 1100 rpm.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of processing kaolin, comprising sequentially:
providing a kaolin crude comprising higher amount of gray kaolin and a lower amount of white kaolin;
degritting the kaolin crude;
subject the degritted kaolin crude to flotation to provide a kaolin having reduced titania content;
ozonating the kaolin having reduced titania content;
centrifuging the kaolin at high speeds to provide a coarse stream and fine stream, the course stream comprising kaolin wherein at least about 70% by weight has a size of 2 microns or less, the fine stream comprising kaolin wherein at least about 80% by weight has a size of 1 micron or less;
refining the coarse stream into a coarse engineered kaolin pigment, wherein the coarse engineered kaolin pigment has a surface area from about 15 to about 19 $m^2/g$ and about 0.75% by weight or less of titania; and
refining the fine stream into a fine glossing kaolin pigment;
with the proviso that the method does not comprise fractioning the kaolin.

2. The method of claim 1, wherein centrifuging at high speeds involves using at "g" forces from about 2,000 to about 10,000.

3. The method of claim 1, wherein the kaolin crude comprises at least about 70% of gray kaolin and less than about 30% of white kaolin.

4. The method of claim 1, wherein flotation reduces the titania content of the kaolin to less than about 1% by weight.

5. The method of claim 1, wherein ozonating comprises contacting from about 0.1 to about 20 pounds of ozone per ton of kaolin.

6. The method of claim 1, further comprising centrifuging the kaolin at low speeds before flotation or after centrifuging the kaolin at high speeds.

7. The method of claim 6, wherein centrifuging at low speeds involves using "g" forces from about 200 to about 2,000.

8. The method of claim 1, wherein refining the fine stream comprises at least two of delamination, bleaching, filtering, and spray drying.

9. The method of claim 1, wherein refining the fine stream comprises at least two of delamination, bleaching, filtering, and drying.

10. A method of processing kaolin, comprising sequentially:
providing a kaolin crude comprising at least about 60% of gray kaolin and less than about 40% of white kaolin;
degritting the kaolin crude;
subjecting the degritted kaolin crude to flotation to provide a kaolin having reduced titania content;
ozonating the kaolin having reduced titania content;
centrifuging the kaolin at high speeds to provide a coarse stream and find stream, the coarse stream comprising kaolin wherein at least about 80% by weight has a size of 2 microns or less, the fine stream comprising kaolin wherein at least about 80% by weight has a size of 1 micron or less; and
bleaching, filtering, and spray drying the coarse stream to provide a coarse engineered kaolin pigment, wherein the coarse engineered kaolin pigment has a surface area from about 15 to about 19 $m^2/g$ and about 0.75% by weight or less of titania;
with the proviso that the method does not comprise fractioning the kaolin.

11. The method of claim 10, further comprising combining the fine stream with a white kaolin to provide a kaolin pigment having a brightness of at least about 90.

12. The method of claim 10, wherein degritting the kaolin crude comprises passing the kaolin crude through at 325 mesh sieve or smaller.

13. The method of claim 10, wherein flotation comprises one of froth flotation, ultraflotation, and TREP flotation.

14. The method of claim 10, further comprising refining the fine stream into a line glossing kaolin pigment.

15. The method of claim 1, wherein flotation is conducted using a solids contents from about 10% to about 50%, a pH from about 5 to about 11, and at a temperature from about 10° C. to about 90° C.

16. The method of claim 10, wherein flotation is conducted using a solids content from about 20% to about 40%, a pH from about 6 to about 10, and at a temperature from about 20° C. to about 60° C.

17. The method of claim 10, wherein flotation reduces the titania content of the kaolin to less than about 0.7% by weight and iron oxide to less than about 1.25% by weight.

18. The method of claim 1, wherein the coarse engineered kaolin pigment has at least about 96% by weight of the particles having a size of 5 microns or less, at least about 90% by weight of the particles having a size of 2 microns or less, at least about 25% by weight of the particles having a size of 0.3 microns or less, a surface area from about 15 to about 19 m$^2$/g, about 0.75% by weight or less of titania, about 1.25% by weight or less of iron oxide, and a brightness of about 87.5 or more; and the fine glossing kaolin pigment has at least about 90% by weight of the particles having a size of 1 micron or less, at least about 97% by weight of the particles having a size of 2 microns or less, at least about 98% by weight of the particles having a size of 5 microns or less, from about 65% to about 80% of the particles having a size of 0.3 microns or less, a surface area from about 22 to about 29 m$^2$/g, about 0.5% by weight or less of titania, about 1.25% by weight or less of iron oxide, brightness of about 90 or more, and high shear viscosity of about 15 dynes/4400 rpm or less at 70% solids.

19. The method of claim 10, wherein the coarse engineered kaolin pigment has at least about 97% by weight of the particles having a size of 5 microns or less, at least about 95% by weight of the particles having a size of 2 microns or less, from about 26% to about 33% by weight of the particles having a size of 0.3 microns or less, a surface area from about 16 to about 19 m$^2$/g, about 0.5% by weight or less of titania, about 1% by weight or less of iron oxide, and a brightness of about 89 or more; and the fine glossing kaolin pigment has at least about 95% by weight of the particles having a size of 1 micron or less, at least about 99% by weight of the particles having a size of 2 microns or less, at least about 99.9% by weight of the particles having a size of 5 microns or less, from about 70% to about 75% of the particles having a size of 0.3 microns or less, a surface area from about 23 to about 28 m/g, about 0.4% by weight or less of titania, about 1% by weight or less of iron oxide, brightness of about 91 or more, and high shear viscosity of about 10 dynes/4400 rpm or less at 70% solids.

* * * * *